Sept. 22, 1953 J. A. ADAMS 2,652,680
BASKET YARD RAKE
Filed May 23, 1951 2 Sheets-Sheet 1
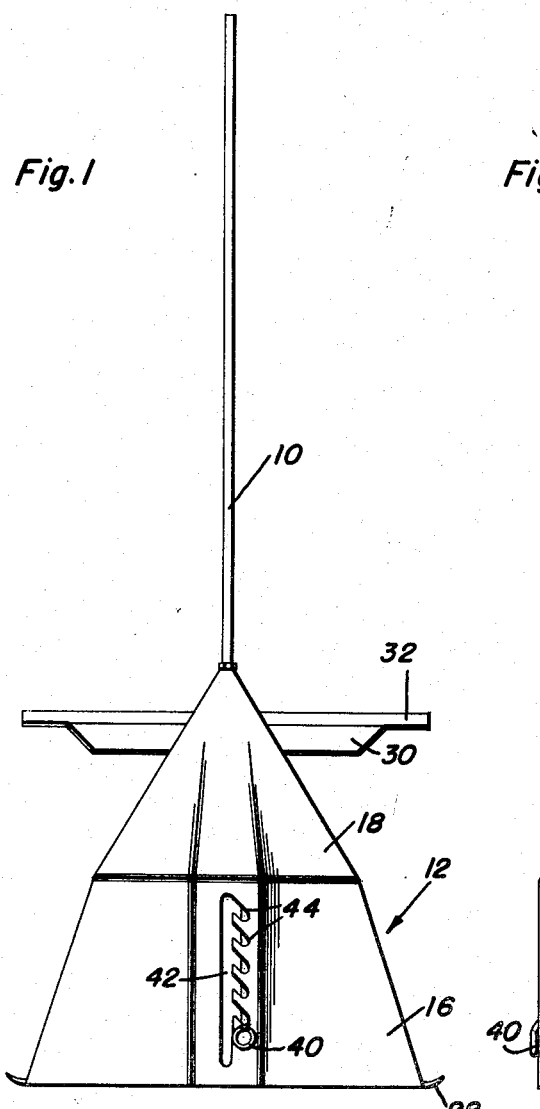
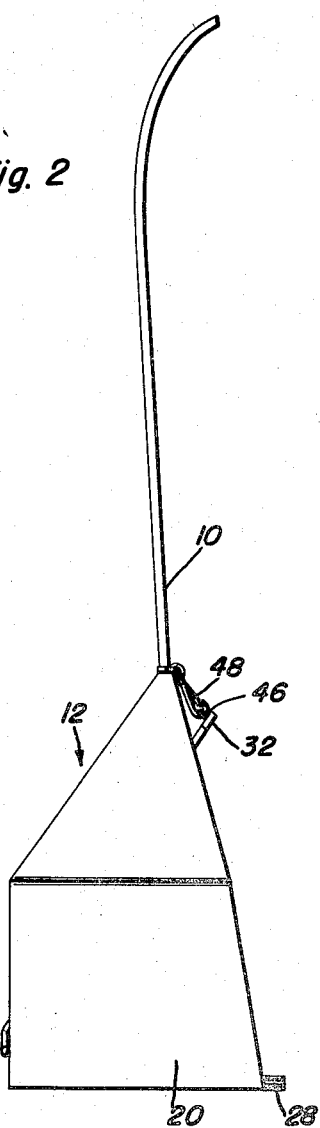
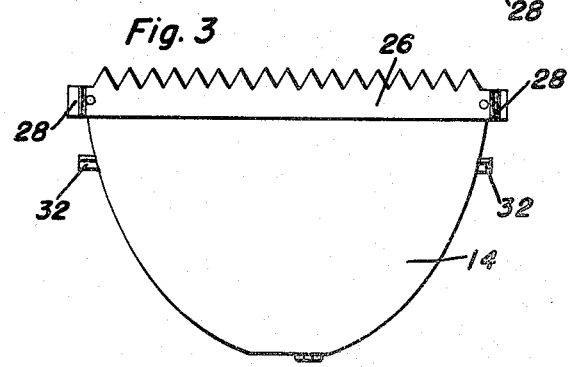
Johathan A. Adams
INVENTOR.
BY *Attorneys*

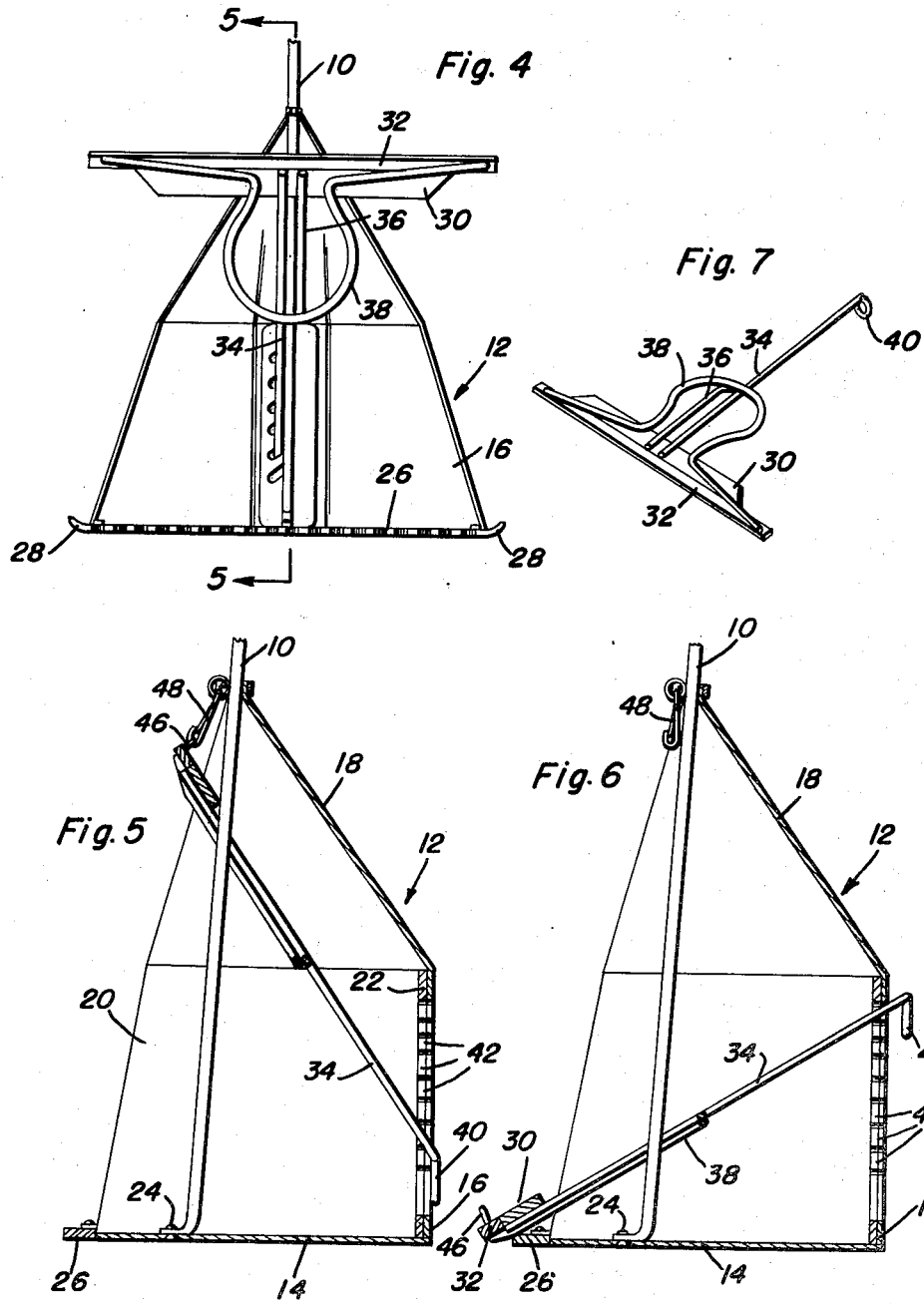

Patented Sept. 22, 1953

2,652,680

UNITED STATES PATENT OFFICE 2,652,680

BASKET YARD RAKE

Johathan A. Adams, New Market, Iowa

Application May 23, 1951, Serial No. 227,864

12 Claims. (Cl. 56—400.11)

This invention comprises novel and useful improvements in a basket yard rake and more specifically pertains to a combined rake and gathering or collecting device whereby the material raked may be collected within a chamber or receptacle forming a part of the rake and carried thereby and discharged therefrom as desired.

The principal object of this invention is to provide an improved yard rake incorporating therewith a basket-like receptacle whereby the material collected by the rake may be trapped in the receptacle and moved thereby and discharged therefrom as desired.

A further object of the invention is to provide an improved basket rake in conformity with the preceding object having improved mechanism for controlling and actuating a closure for the basket receptacle of the rake.

Still another object of the invention is to provide a basket rake which shall be capable of use in the conventional manner of ordinary rakes when desired, but may be also employed to gather and collect material assembled by the rake for lifting and transporting the same.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a rear elevational view showing an embodiment of a rake incorporating therein the principles of this invention;

Figure 2 is a side elevational view of the construction of Figure 1;

Figure 3 is a bottom plan view of the rake of Figure 1;

Figure 4 is a rear elevational view of the rake partially in section of Figure 1, the rake gate being shown in its raised or open position;

Figure 5 is a vertical sectional view taken substantially upon the plane indicated by the sectional line 5—5 of Figure 4 and showing further details of the receptacle and of the gate therefor, the latter being shown in its open or raised position;

Figure 6 is a view similar to Figure 5 but showing the gate in its closed or lowered position; and Figure 7 is a perspective detail view of the gate construction of the rake.

Referring now more specifically to the accompanying drawings, wherein like numerals designate similar parts throughout the various views, it will be seen that the novel rake forming the subject of this invention is illustrated herein as including a handle 10 together with a basket-like receptacle indicated generally by the numeral 12.

As will be best seen from Figures 5 and 6, the receptacle 12 is open at one side, being provided with an end wall 14, a reversible top and bottom wall 16, depending upon the position of the rake, and which includes a triangular-shaped, angularly disposed end wall 18. In addition, the receptacle 12 includes a pair of side walls, one of which is shown at 20. The wall 16 is provided with a reinforcing strip 22 of a construction for a purpose to be later set forth.

The rake handle 10 is secured to the apex of the triangular-shaped wall portion 18 and extends into the receptacle 12 where it is attached to the end wall 14 adjacent the open side of the receptacle by any suitable means such as by a bolt or rivet 24.

Upon the edge of the end wall 14 at the opening of the receptacle there is provided an outwardly extending toothed rake blade 26, secured to the receptacle in any desired manner. Preferably, the ends of this rake blade are curved slightly as shown at 28 in Figures 1 and 4.

As so far described, the rake may be employed for the conventional purposes of a rake by positioning the same with the rake teeth against the ground and with the receptacle disposed with its open portion adjacent the surface of the ground, and with its wall 16 elevated thereabove. In this position, the rake may be manipulated in the usual manner whereby the rake blade will collect grass or other material, the curved ends facilitating the gathering of this material into a compact mass. The present invention utilizes a movable gate for controlling the open side of the receptacle 12 to thereby trap and retain material collected by the rake within the receptacle so as to permit the carrying of this material and its disposition as desired. This gate construction, as shown best in Figures 4–7, consists of a flat plate 30 which is of sufficient size to fit within the open end of the receptacle 12 between the side walls 20 when the gate is in the position shown in Figure 6. To this plate 30 there is secured a bar 32 whose ends extend beyond the ends of the plate and which extending ends are adapted to abut the side walls 20 to thereby limit inward movement of the gate with respect to the receptacle.

The gate assembly further includes a gate rod 34 which is welded or otherwise fixedly secured to the gate members 30 and 32 for operating the same, this rod 34 having fixedly secured thereto a parallelly disposed member 36 which is likewise secured to the gate members 30 and 32. The members 34 and 36 are disposed in parallel spaced relation to each other to form a guide means as set forth hereinafter.

The gate assembly further includes a rod-like member constituting a loop or bail 38 whose ends are welded or otherwise fixedly secured to the gate member 32 as shown in the drawings. The loop portion 38 of this bail crosses the rod 34 and is fixedly secured thereto as by welding or the like. At its outer end, the rod 34 is provided with a ring 40 for a purpose which will be subsequently described.

The reinforcing member 22 and the associated part of the receptacle wall 16 are provided with a longitudinally extending slot 42, see Figure 1, through which the rod 34 extends and is slidably movable. The slot 42 is provided with a plurality of longitudinally spaced angularly disposed and inclined sockets or recesses 44 into which the rod 34 may be selectively placed to hold the same in adjusted position, as will be readily apparent from an inspection of Figure 1 in conjunction with Figures 5 and 6.

As shown best in Figures 5 and 6, the gate member 32 has secured to its mid portion an upstanding eye 46 which is adapted, in the raised position of the gate as shown in Figure 5, to be engaged by the snap hook 48 secured to the handle 10 and/or the end of the triangular portion 18 of the receptacle 12 to detachably secure and hold the gate member in its raised position.

In its assembled position, the loop or bail 38 is adapted to loosely embrace that portion of the handle 10 which extends into the interior of the receptacle 12 to assist in retaining the gate assembly upon the handle; and also to constitute a grill-like means, as will be apparent from a comparison of Figures 4, 7 and 6, for retaining the grass or other material received within the receptacle when the gate is in its closed position.

The guide members 36 and 34 are adapted to slidably embrace the handle 10 and thus constitute a guide preventing lateral displacement of the gate relative to the handle as the gate is moved from its raised position as shown in Figure 5 to its lowered position as shown therein. Thus, it may be seen that members 36 and 34 and the portion of bail 38 crossing these members constitute a retaining means loosely encircling the handle.

When it is desired to utilize the device in the manner of a conventional rake, the gate assembly is disposed as shown in Figure 5 with the eye 46 retained in the releasable hook 48, and with the gate rod 34 disposed adjacent the lower end of the slot and seated in one of the locking recess 44 therein. In this position, the gate is raised whereby the rake blade may serve its conventional function for gathering grass or other material into a mass. After the material has been collected, the hook 48 may be released, and by grasping the ring 40 and moving the rod 34 to the upper end of the slot 42, the gate will be permitted to fall at its other end into the position shown in Figure 6, at which time the gate plate 30 will rest upon the rake blade 26, whereby the plate 30 and the members 38 and 36 will constitute a grill-like closure for securing the material within the rake whereby this material may be readily transported. In this position, it will be noted that the gate rod 34 is raised and may be disposed in one of the retaining sockets 44 adjacent the upper end of the slot 42.

When the user has carried the material disposed within the basket of the rake to the desired position, the gate may be again opened and secured in the raised position shown in Figure 5 and the material dumped from the rake.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A basket rake comprising a receptacle having a filling and discharge opening, a toothed rake blade secured to a wall of said receptacle at the edge of said opening, a handle secured to said receptacle, a movable gate for said opening secured to said receptacle and movable into engagement with said rake blade for closing said opening.

2. The combination of claim 1 wherein said handle extends into the interior of said receptacle, said gate being disposed within said receptacle and having retaining means loosely encircling said handle.

3. The combination of claim 1 wherein said handle extends into the interior of said receptacle, said gate being disposed within said receptacle and having retaining means loosely encircling said handle, control means connected to said gate and extending to the exterior of said receptacle for manual operation.

4. The combination of claim 1 wherein said handle extends into the interior of said receptacle, said gate being disposed within said receptacle and having retaining means loosely encircling said handle, said gate including a flat plate engageable with said toothed blade along the length thereof.

5. The combination of claim 1 wherein said handle extends into the interior of said receptacle, said gate being disposed within said receptacle and having retaining means loosely encircling said handle, said gate including a flat plate engageable with said toothed blade along the length thereof, a bail on said plate encircling said handle for securing said gate thereto while permitting movement of said gate within said receptacle.

6. The combination of claim 1 wherein said handle extends into the interior of said receptacle, said gate being disposed within said receptacle and having retaining means loosely encircling said handle, said gate including a flat plate engageable with said toothed blade along the length thereof, a bail on said plate encircling said handle for securing said gate thereto while permitting movement of said gate within said receptacle, said receptacle having an elongated slot in a wall thereof, said gate having a control rod extending through said slot for slidable movement.

7. The combination of claim 1 wherein said handle extends into the interior of said receptacle, said gate being disposed within said receptacle and having retaining means loosely encircling said handle, said gate including a flat plate engageable with said toothed blade along the length thereof, a bail on said plate encircling said handle for securing said gate thereto while permitting movement of said gate within said receptacle, said receptacle having an elongated slot in a wall thereof, said gate having a control rod extending through said slot for slidable movement, said slot having longitudinally spaced locking recesses for said rod.

8. The combination of claim 1 wherein said handle extends into the interior of said receptacle, said gate being disposed within said receptacle and having retaining means loosely encircling said handle, said gate including a flat plate engageable with said toothed blade along the length thereof, a bail on said plate encircling said handle for securing said gate thereto while permitting movement of said gate within said receptacle, said receptacle having an elongated slot in a wall thereof, said gate having a control rod extending through said slot for slidable movement, said rod having guide means slidably engaging said handle.

9. The combination of claim 1 wherein said handle extends into the interior of said receptacle, said gate being disposed within said receptacle and having retaining means loosely encircling said handle, said gate including a flat plate engageable with said toothed blade along the length thereof, said receptacle having an elongated slot in a wall thereof, said gate having a control rod extending through said slot for slidable movement.

10. The combination of claim 1 wherein said handle extends into the interior of said receptacle, said gate being disposed within said receptacle and having retaining means loosely encircling said handle, said gate including a flat plate engageable with said toothed blade along the length thereof, said receptacle having an elongated slot in a wall thereof, said gate having a control rod extending through said slot for slidable movement, said slot having longitudinally spaced locking recesses for said rod.

11. The combination of claim 1 wherein said handle extends into the interior of said receptacle, said gate being disposed within said receptacle and having retaining means loosely encircling said handle, said gate including a flat plate engageable with said toothed blade along the length thereof, said receptacle having an elongated slot in a wall thereof, said gate having a control rod extending through said slot for slidable movement, said slot having longitudinally spaced locking recesses for said rod, said rod having guide means slidably engaging said handle.

12. The combination of claim 1 wherein said handle extends into the interior of said receptacle, said gate being disposed within said receptacle and having retaining means loosely encircling said handle, said gate including a flat plate engageable with said toothed blade along the length thereof, a bail on said plate encircling said handle for securing said gate thereto while permitting movement of said gate within said receptacle, hook means for retaining said gate in its open position.

JOHATHAN A. ADAMS.

References Cited in the file of this patent

UNITED STATES PATENTS

| Number | Name | Date |
| --- | --- | --- |
| 1,473,572 | Fitzgerald | Nov. 6, 1923 |
| 2,193,436 | Stratford | Mar. 12, 1940 |